United States Patent [19]

Skillicorn et al.

[11] Patent Number: 5,244,995
[45] Date of Patent: Sep. 14, 1993

[54] VINYL HALIDE AQUEOUS POLYMERIZATION DISPERSANT SYSTEM

[75] Inventors: Douglas E. Skillicorn, Elyria; Keith L. Gardner, Avon; Lance A. Mayer, Strongsville; Scott Perry, Avon Lake, all of Ohio

[73] Assignee: The BF Goodrich Company, Brecksville, Ohio

[21] Appl. No.: 913,116

[22] Filed: Jul. 14, 1992

Related U.S. Application Data

[62] Division of Ser. No. 604,848, Oct. 26, 1990, Pat. No. 5,155,189.

[51] Int. Cl.$^5$ .................. C08F 20/44; C08F 14/06; C08F 36/06; C08F 12/08
[52] U.S. Cl. .................. 526/340; 526/344.2; 526/345; 526/346; 526/342
[58] Field of Search .................. 526/344.1, 344.2, 340, 526/342, 345, 346

[56] References Cited

U.S. PATENT DOCUMENTS

| | | | |
|---|---|---|---|
| 3,522,227 | 7/1970 | Thomas | 526/65 |
| 3,707,585 | 12/1972 | Okamoto et al. | 526/346 X |
| 4,435,524 | 3/1984 | Dinsbergs | 521/65 |
| 4,771,114 | 9/1988 | Kobayashi et al. | 526/66 |
| 4,775,702 | 10/1988 | Cozems | 521/63 |
| 5,155,185 | 10/1992 | Di Rienzo | 526/88 |

FOREIGN PATENT DOCUMENTS 1482973  1/1975  Fed. Rep. of Germany.
1530854  5/1977  France.

Primary Examiner—Joseph L. Schofer
Assistant Examiner—Mark Nagumo
Attorney, Agent, or Firm—Miles B. Dearth

[57] ABSTRACT

A process for preparing a particulate vinyl polymer resin and vinyl polymer resin derived therefrom wherein, comprising polymerization in the presence of a dispersant or graft dispersant having no ionic side groups, optionally containing terminal functional groups, said dispersant is derived from repeating units of $\alpha,\beta$-unsaturated ester(s) of acrylic and/or methacrylic acid and having a molecular weight average of from about 500 to about 50,000.

12 Claims, No Drawings

VINYL HALIDE AQUEOUS POLYMERIZATION DISPERSANT SYSTEM

This is a divisional application of application Ser. No. 07/604,848 filed Oct. 26, 1990, now U.S. Pat. No. 5,155,189.

FIELD OF THE INVENTION

This invention is directed to polymerization of particulate thermoplastic polymer resins. A process is disclosed for polymerization with the use of polymerization dispersants. Specifically, the process and product produced therefrom entails the use of secondary dispersants optionally in combination with other dispersants whereby improvements are achieved in resin qualities. In particular, improved particle porosity, short plasticizer powder mix times, reduction in the incidence of undesired fine particulates, lower in-process foaming tendencies, fewer fish eyes and less reactor fouling are achieved.

BACKGROUND OF THE INVENTION

The state of the art pertaining to polymerization processes for producing commodity thermoplastics such as polyvinyl chloride (PVC) has undergone continual advancement. Significant improvements in chemistry and process interactions have occurred for example with suspension processes in the last two decades. Advances have been directed toward improving polymer properties as well as the following resin characteristics: porosity, residual monomer desorption, polymerization and stripping cycle times, compounding parameters, control of primary particle agglomeration, bulk density, reduction of particle fines and reactor fouling. Improvements of these properties still derive substantial economic advantages required for continued competitiveness in this large volume, maturing polymer technology.

There are examples of varied approaches directed toward achieving some the aforementioned improvements in resin quality. U.S. Pat. No. 4,603,151 to Dinbergs discloses a colloidal dispersant system to produce porous, spherical agglomerates by the use of substantially unneutralized crosslinked interpolymers of one or more carboxylic acid monomers, for example, a crosslinked polyacrylic acid polymer. The crosslinking is instrumental in the avoidance of a highly agglomerated charge, thereby preserving the spherical shape of the resin particles. Two other dispersion stabilizing surfactants are used in conjunction with the preferred crosslinked polycarboxylic dispersant. One is a polyether nonionic type and the other a non-polyether containing type. The purpose of these two surfactants is to improve the porosity. The result of employing the three dispersants is a significantly higher proportion of particles having spherical shape while maintaining low incidences of glassy particles.

U.S. Pat. No. 4,458,057 to Basu discloses a method directed at producing spherical, porous PVC resin particles and at the same time eliminating reactor build-up. The resulting particles are non-agglomerated, spherical, highly porous and have the same size distribution as the liquid dispersion. Prior to polymerization, the dispersant employed is a crosslinked water swellable, but water insoluble interpolymer of one or more carboxylic acid monomers. Partial neutralization of the acid is required prior to onset of polymerization.

U.S. Pat. No. 4,579,923 discloses improved porous PVC particles by the use of dispersants derived from an adduct of hydroxypropylmethacrylate and propylene oxide. The acrylate adduct is a comonomer for the vinyl chloride polymerization and is believed to provide steric stabilization of the PVC primary particles and improved attachment via ethylenic unsaturation as compared with prior art secondary surfactants, e.g. low hydrolysis polyvinyl acetate or esters of polyols such as sorbitol monostearate.

A background discussion of relevant work can be found in *The Encyclopedia of PVC*, Vol. 1, 2nd ed., edited by Nass and Heiberger, Marcel Dekkar Inc., New York, pp. 110–127. Generally, conventional dispersant systems for suspension PVC are considered to consist of a combination of a primary suspending agent which primarily controls the particle size through control of interparticle agglomeration and optionally a secondary suspending agent which is believed to control porosity by controlling intraparticle agglomeration of primary particles. The primary suspension agents are typically cellulose ethers such as hydroxypropylmethylcellulose or partially hydrolyzed polyvinyl alcohols. Some conventional secondary dispersants are described as having a hydrophile-lipophile balance (HLB) ranging generally from about 4 to 10, thus being relatively higher in monomer solubility.

Commonly used secondary dispersants include sodium lauryl sulfate (U.S. Pat. No. 3,042,665), sodium dioctyl sulfosuccinate (U.S. Pat. No. 2,985,638) and sorbitan esters (U.S. Pat. No. 4,000,355). Low molecular weight polyvinyl acetates of low degrees of hydrolysis have been suggested. The use of secondary dispersants in many instances create colloidal stability upsets resulting in a particularly troublesome problem of reactor buildup or fouling. Reactor buildup is a serious problem where resin particles remain attached to sidewalls, baffles and fixtures. These show up as dark, discolored or gelled contamination on subsequent reactor charges as the buildup sloughs off. The use of secondary dispersants also can result in reduced particle size, excessive particle fines, and foaming during monomer stripping. Foaming problems occur generally when venting the reactor to the monomer recovery system wherein entrained foam passes resin into the recovery system causing clogging of recovery piping and contamination of the recovered monomer. Venting must be slowed considerably when this occurs, as such, foaming has a serious impact on resin quality and reactor cycle time.

Due to the importance of achieving sufficient porosity and short plasticizer powder mix times and the dependence on employing secondary dispersants to achieve such, it would be advantageous to employ porosity enhancing secondary dispersants which do not destabilize the colloidal suspension. It would also be desirable to employ dispersants without a significant reduction in resin particle size. Furthermore, other desirable features would include fewer incidences of particle fines, reduced foaming during monomer stripping and reduced reactor fouling.

SUMMARY OF THE INVENTION

This invention discloses a process for producing polymers and polymers produced therefrom comprising polymerizing monomer(s) in the presence of relatively low molecular weight polymer(s) derived from α, β-unsaturated ester including preferredly those alkyl esters of acrylic or methacrylic acid, graft copolymers, copolymers and polymer mixtures. Said dispersants were found to provide improved resin properties prepared in an aqueous polymerization medium. In particularly preferred embodiments, said dispersant contains at least one terminal functional group selected from the group consisting of: ethylenic unsaturated, hydroxyl, carboxyl, anhydro, mercapto, oxirane, amino, amido or isocyanato groups. The present process yields particulate polymer resins having surprising new combinations of desirable features such as high porosity, rapid plasticizer powder mix times, reduction in the incidence of small particles, fewer fisheyes, lower in-process foaming and less reactor fouling.

DETAILED DESCRIPTION OF PREFERRED EMBODIMENTS

The process of the present invention can be embodied in any chosen polymerization method yielding particulate polymer resins by advantageous use of the dispersants herein disclosed. Mass, suspension, dispersion, emulsion and micro suspension processes are all pertinent to the process disclosed herewith. Preferably, the practice of the invention is carried out in an aqueous medium.

A mass process is described in U.S. Pat. No. 3,522,227, incorporated herein by reference. An emulsion process is disclosed in U.S. Pat. No. 4,458,057 incorporated herein by reference. A phase inversion process may also be used. Such a phase inversion process is disclosed in U.S. Pat. No. 3,706,722, incorporated herein by reference. In the phase inversion process, the monomer is the continuous phase during the early part of the polymerization and after about 10% monomer conversion additional water is added whereby a phase inversion takes place. Beyond this point, water is the continuous phase and monomer becomes the dispersed phase.

A variety of well known particulate vinyl ($H_2C=C<$) polymers can be advantageously prepared by the process of this invention and include for example, poly styrene, styrene copolymers, poly styrene-co-acrylonitrile, acrylics, acrylonitrile-butadiene-styrene, polyvinyl chloride (PVC), PVC homo-, and copolymers and other known particulate polymers. For the sake of brevity, a detailed description for illustration of examples will pertain to the preparation of PVC resins by the aqueous suspension polymerization method. It is understood that this description is not a limitation as to the polymer compositions nor the particular polymerizing technique which can be pursued in the practice of this invention.

Polyvinyl chloride resin, an exemplary particulate resin made using the process of this invention, means polyvinyl chloride homopolymers as well as vinyl chloride polymerized with up to 50%, preferably not more than about 20%, by weight of one or more other ethylenic unsaturated comonomers having at least one terminal $CH_2=C<$ grouping. Suitable comonomers that may be polymerized with vinyl chloride are the $\alpha,-\beta$-olefinically unsaturated carboxylic acids, such as acrylic acid, methacrylic acid, ethacrylic acid, $\alpha$-cyanoacrylic acid, and the like; esters of acrylic acid, for example, methyl acrylate, ethyl acrylate, butyl acrylate, octyl acrylate, cyanoethyl acylate, and the like; vinyl esters such as vinyl acetate, propionate and butyrate; esters of methacrylic acid, such as methyl methacrylate, ethyl methacrylate, butyl methacrylate, and the like; nitriles, such as acrylonitrile and methacrylonitrile; acrylamides, such as methyl acrylamide, N-methylol acrylamide, N-butoxy methacrylamide, and the like; vinyl ethers, such as ethylvinyl ether, chloroethyl vinyl ether, and the like; the vinyl ketones, styrene derivatives including $\alpha$-methyl styrene, vinyl toluene, chlorostyrene; vinyl naphthalene; vinylidene chloride, vinyl bromide; crosslinking monomers such as diallyl phthalate, trimethylol propane triacrylate, allyl methacrylate and the like; allyl and vinyl chloroacetate, vinyl acetate, vinyl pyridine, and methyl vinyl ketone; olefins such as ethylene and propylene; and other copolymerizable monomers or mixtures of monomers having suitable reactivity ratios with vinyl chloride monomer and known to those skilled in the art. The amount of comonomer that can be copolymerized with vinyl chloride is a function of the choice of comonomer and the intended end-use, as would be understood by those skilled in the art.

An exemplary polymerization process for the present invention is an agitated aqueous suspension polymerization process. Suspension polymerization techniques to prepare PVC for example are well-known in the art as set forth in *The Encyclopedia of PVC*, pp. 76–85, published by Marcel Decker, Inc. (1976) and need not be discussed in great detail here. Within the scope of the present invention, this example technique involves the preparation of polymers polymerized from monomer(s) dispersed in an aqueous medium containing: (1) one or more primary dispersing agent(s) consisting of one or more polymers such as polyvinyl alcohol having degree of hydrolysis of generally 70–80%; there may also be present polyvinyl alcohol having a degree of hydrolysis higher than about 80%; also, there may be cellulose ether, hydroxypropyl methyl cellulose (HPMC), partially hydrolyzed polyvinyl acetate, vinyl acetate-maleic anhydride, partially saponified polyalkyl acrylate or gelatine present; (2) one or more secondary dispersants described hereinbelow and (3) a monomer soluble polymerization initiator. A conventional secondary dispersant is a polyvinyl acetate polymer having a degree of hydrolysis of generally 20–60% (PVA-LH).

Suitable polymerization initiators are selected from the conventional free radical initiators such as organic peroxides and azo compounds. The particular free radical initiator will depend upon the monomeric materials being polymerized, the molecular weight and color requirements of the polymer and the desired temperature of the polymerization reaction. Insofar as the amount of initiator employed is concerned, generally an amount in the range of about 0.005 part by weight to about 1.00 part by weight, based on 100 parts by weight of monomer(s) being polymerized, is satisfactory. It is preferred to employ an amount of initiator in the range of about 0.01 part by weight to about 0.20 part by weight, based on 100 parts by weight of vinyl halide monomer. Examples of suitable initiators include lauroyl peroxide, benzoyl peroxide, acetyl cyclohexyl sulfonyl peroxide, diacetyl peroxide, cumeme hydroperoxides, t-butyl peroxyneodecanoate, alpha-cumyl peroxyneodecanoate, t-butyl cumyl peroxyneodecanoate, t-butyl peroxypivalate, t-butyl peroxyoctoate, isopropyl peroxydicarbonate, di-n-propyl peroxydicarbonate, disecondary butyl peroxydicarbonate (SBP), 2,2'-azobis-(2,4,-dimethyl valeronitrile), azobisisobutyronitrile, azo-diisobutyrate and t-butyl perbenzoate, the choice depending generally on the reaction temperature range selected. Of course, more than one initiator may be used.

The suspension polymerization process of this invention may be carried out at any suitable temperature range which is known and typical for the chosen method and monomer(s) to be polymerized. For instance, a temperature range from about 0° C. to about 80° C. may be generally employed for producing vinyl halide polymers. Preferably for PVC, a temperature range from about 40° C. to about 70° C. may be employed with a range from about 50° C. to about 60° C. being the most preferred. The temperature within this range, may be kept constant or varied during the course of the polymerization. In order to facilitate temperature control, the reaction medium is kept in contact with heated or cooled surfaces. Cooling is typically necessary.

Conversion of vinyl monomer generally refers to the amount of polymer isolated as a percentage of monomer charged. Percent PVC conversion can range from as low as 20% to as high as about 90%. Preferably conversion is in the range from about 50% to about 80%. Polymerization may be terminated by the use of short-stopping agents or stabilizers which exhibit polymerization arresting characteristics. An exemplary listing of stabilizers which tend to inhibit polymerization and which are suitable for use as short-stopping agents in accordance with the present invention include the sulfur-containing organo-tin stabilizers, especially di-n-butyl tin S,S'-bis-(isoctyl mercapto acetate), di-n-butyl tin-bis-mercaptopropanoate, di-n-butyl tin bis-(isobutyl thioglycolate), n-butyl tin tris-(isobutyl thioglycolate), and tri-n-butyl tin isobutyl thioglycolate, as well as organic phosphites, and mixed salts thereof. Other exemplary short-stopping agents include alpha-methylstyrene, hydroquinone, naphthoquinone and various phenolics such as phenol and bisphenol-A; thioalcohols, amines, as for example diphenylamine, triphenylamine, triethylamine and ethylenediamine tetraacetic acid, and natural tar acids. The short-stopping agent is employed in amount effective to terminate the polymerization reaction. Generally, less than about 2 percent by weight of short-stopping agent, based on the weight of charged vinyl chloride monomer, is sufficient. For practical purposes the amount of short-stopping agent required to terminate vinyl chloride polymerization will range between about 0.01 to about 2 percent by weight of the monomer charged.

DISPERSANTS EMPLOYED IN THIS INVENTION

Polymeric dispersants used in place of or in combination with conventional dispersant(s) were found to unexpectedly improve the aforementioned resin qualities and are derived from relatively low molecular weight polymers of $\alpha,\beta$-unsaturated carboxylic ester monomer(s). Inclusive of these dispersants are graft copolymers, copolymers or polymer mixtures. The dispersants optionally and preferredly contain one or more terminal functional groups.

Preferred principal monomers employed in the preparation of the dispersants used in this invention are ethylenic unsaturated carboxylic esters derived from acrylic or methacrylic acid, copolymers and polymer mixtures having the general structure:

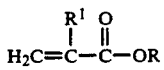

wherein $R^1$ is H or methyl; R is an alkyl group having 1 to 24 carbon atoms, or R is an alkoxyalkyl group preferably having a total of about 2 to 12 carbon atoms, an aryloxyalkyl group, aralkoxyalkyl group preferably having 7 to 12 carbon atoms, or an aralkyl group preferably having up to 10 carbon atoms. The preferred R group is an alkyl group containing 1 to 24 carbon atoms, more preferably R is an alkyl of 4 to 18 carbon atoms and most preferably R is an alkyl of 4 to 10 carbon atoms. Preferred acrylic or methacrylic acid ester monomers are methyl methacrylate, ethyl methacrylate, n-butyl methacrylate, isobutyl methacrylate, t-butyl methacrylate, n-pentyl methacrylate, t-butyl methacrylate, hexyl methacrylate, and cyclohexyl methacrylate. Additional monomers some of which include a functional group are: dimethylaminoethyl methacrylate, 2-hydroxyethyl methacrylate, 2-hydroxypropyl methacrylate, lauryl methacrylate, stearyl methacrylate, cyclohexyl methacrylate, dimethylaminoethyl methacrylate, 5-butylaminoethyl methacrylate, 2-hydroxyethyl methacrylate, 2-hydroxypropyl methacrylate, oxazolindinylethyl methacrylate, allyloxyethyl methacrylate, isopropyloxazolidinylethyl methacrylate, isopropylidene glyceryl methacrylate, and $\gamma$-ketiminopropyl methacrylate. Specific examples of acrylate ester monomers are the alkyl acrylates such as methyl acrylate, ethyl acrylate, propyl, isopropyl and cyclopropyl acrylates, isobutyl, t-butyl, butyl and cyclobutyl acrylates, pentyl and cyclopentyl acrylates, hexyl and cyclohexyl acrylates, heptyl and cycloheptyl acrylates, octyl acrylate, 2-ethylhexyl acrylate, nonyl acrylates, decyl acrylates, phenylethyl acrylate, phenylpropyl acrylates, methoxyethyl acrylate, ethoxyethyl acrylate, butoxyethyl acrylates, hexyloxypropyl acrylates, ethyl 2-hydroxymethylacrylate, ethoxypropyl acrylates, propoxybutyl acrylates, hexyloxyhexyl acrylates, lauryl acrylate, myristyl acrylate, cetyl acrylate, stearyl acrylate, and the like.

The polymer dispersant may be a copolymer having less than 50 weight percent of one or more comonomers other than the principal monomer. Comonomers are selected from the group of consisting of acrylates or methacrylates listed above, vinyl esters such as vinyl acetate, and vinyl propionate; vinyl aromatics such as styrene, $\alpha$-methyl styrene, and vinyl toluene; nitriles such as acrylonitrile and methacrylonitrile, monoolefins containing 2 to about 4 carbon atoms such as ethylene, propylene, isobutylene; $C_5$ to $C_8$ alpha olefins; dienes containing 4 to about 10 carbon atoms such as butadiene, isoprene, and chloroprene; vinyl and allyl ethers such as vinyl methyl ether, allyl methyl ether and mixtures. No monomers are employed which contain ionic groups which form ionic side groups.

Additional exemplary ethylenic unsaturated comonomers copolymerizable with the principal monomers comprising said dispersants are the vinyl esters, vinyl ethers, acrylonitrile, methacrylonitrile, and various olefins. Included among the comonomers are copolymerizable compounds containing an additional ethylenic group, nitrogen or oxygen containing groups, for example ally acrylate, dimethylaminoethyl acrylate, t-butylaminoethyl acrylate, dimethylaminobutyl acrylates, diethylaminoethyl acrylate, morpholinoalkyl acrylates, oxazolidinylalkyl acrylates, piperidinoalkyl acrylates, gamma-ketiminoalkyl acrylates, methoxyethyl acrylate, ethoxyethyl acrylate, butoxyethyl acrylates, hexyloxypropyl acrylates, ethoxypropyl acrylates, propoxybutyl acrylates, hexyloxyhexyl acrylates, phenoxyethyl acrylates, benzyloxyethyl acrylates, allyloxyethyl acrylate, allyloxyethoxyethyl acrylate, allyloxypropyl acrylate, β-thioureidoethyl methacrylate, N-methyl-N'-β-methacryloxyethyl-urea, N-(β-methacryloxypropyl)-N-methylol-N,N'-propyleneurea, β-ureidoethyl acrylate, N-methylol-N'-methylol-N'-β-acryloxyethylurea, N-(β-acryloxyethyl)-N,N'-ethyleneurea, N-(β-acryloxyethyl)-N-methoxymethyl-N,N'-ethyleneurea, N-(β-acryloxyethyl)-N-methoxymethyl-N,N'-ethylenethiourea, N-β-acryloxypropyl)-N,N'-trimethyleneurea, N-[β-(α-acryloxyacetamido)ethyl]-N,N'-ethyleneurea, N-[β-(α-acryloxyacetamido)ethyl]-N-methylol-N,N'-ethyleneurea, N-β-(β-methacryloxyacetamido)ethyl]-N-methylol-N,N'-ethyleneurea, N-[β-(α-methacryloxyacetamido)propyl]-N,N'-propyleneurea, N-[β-(α-acryloxyacetamido)propyl]-N,N'-trimethyleneurea, and N-[β-(α-methacryloxyacetamido)ethyl]-N-methylol-N,N'-ethyleneurea.

In a preferred embodiment said dispersant contains at least one terminal functional group. Preferred terminal functional groups are ethylenic, mercapto, carboxyl, hydroxyl, anhydro, oxirane, amino, amido, isocyanato and mixtures.

Terminal units and terminal functional groups are distinguished from side groups. Side groups are pendant groups on the backbone monomers not including terminal units. Typical low molecular weight linear polymers contain two terminal units on any polymer chain, however chain termination giving rise to a terminal unit may occur within a branched structure. Terminal functional groups are attached only to terminal units. One requirement for the compositions comprising polymeric dispersants used in the process of the instant invention is that there be an absence of pendant ionic side groups. The polymeric dispersants employed in this invention can have terminal ionic groups attached to terminal units, however.

A dispersant useful in the present invention can be a graft reaction product of a relatively low molecular weight terminal ethylenic group containing polymer and a polymer which is has co-reactive addition sites. For example, a terminal ethylenic group containing polyarylate can be grafted to a vinyl polymer having free radical reactive sites on the backbone. This graft may occur in situ when a terminal ethylenic group containing polymeric dispersant is employed and reacts with the particulate polymer. Alternatively, the graft polymer dispersant may be prepared and isolated first and subsequently employed as a dispersant. The prior preparation of such a graft can be accomplished by free radical initiation under elevated temperature and shear mixing in the solid melt state. This method is referred to as reactive processing. Preparation may be alternatively carried out in solution or in a sorbed state depending on the mutual solubilities of the terminal group containing polymer and vinyl polymer grafted thereto.

Dispersants which are also useful in this invention include copolymeric dispersants prepared by a method not involving mixtures of copolymerizable monomers but involving the reaction of a low molecular weight terminal ethylenic group containing polymer and one or more vinyl monomers. This embodiment may be prepared in situ during the polymerization process of this invention for example when a terminal ethylenic group containg polyacrylate ester dispersant copolymerizes with a portion of the monomer(s) forming the particulate polymer produced. Alternatively, the copolymer dispersant can be prepared and isolated separately for subsequent use as a polymerization dispersant in the process of this invention. The terminal ethylenic group containing polymer is incorporated as side chains extending from the vinyl polymer backbone. Preparation of a copolymer dispersant of a vinyl monomer in the presence of a terminal group containing polymer can be carried out in suspension or solvent solution by free radical reaction methods. Any ethylenic unsaturated vinyl monomer such as an olefin, styrene, vinyl ester, acrylate ester, vinyl halide or mixture can be selected.

A primary consideration in monomer selection for preparing a copolymer dispersant pertains to miscibility with the principal monomers subsequently dispersed in the process of this invention. Miscibility of the copolymer dispersant and the monomers comprising the polymer composition is generally understood in light of the solubility parameters which are established for various compositions and referred to by those having skill in the art.

A specific example of a dispersant suitable for use in the present invention as pertaining to suspension PVC is the product of the copolymerization of a terminal ethylenic group containing polyalkylacrylate ester and vinyl chloride monomer which yields a vinyl chloride/polyacrylate copolymer dispersant. This copolymer dispersant can contain terminal functional group(s) on each polyacrylate side chain in a further modification. Examples of a further modification are obtained for instance by reacting a vinyl/polyacrylate copolymer having carboxyl, hydroxyl, mercaptan or amine terminated groups on the polyacrylate side chains with a co-reactive compound such as allyl glycidyl ether, methallyl glycidyl ether, isoprenyl glycidyl ether, glycidyl acrylate or methacrylate thereby incorporating terminal ethylenic unsaturation on each polyacrylate side chain. Such a species having terminal unsaturation is termed a vinyl/polyacrylate macromonomer dispersant.

Another useful embodiment of the dispersant employed in the process of this invention is termed a block copolymer dispersant. A block copolymer dispersant can be prepared by the reaction of a terminal ethylenic unsaturated polymer or vinyl/polyacrylate macromonomer with another polymeric coreactant such as a terminal mercapto or terminal ethylenic group containing polymer to yield the block polymer. A specific example of such an embodiment is the reaction of a vinyl/polyacrylate macromonomer and an acrylated polyglycol ether polymer.

Generally, the polymer dispersant can be prepared by the anionic or free radical polymerization techniques, both well known in the art. The anionic polymerization of low molecular weight acrylate esters having suitability for use in the present invention is taught in U.S. Pat. No. 4,056,559 incorporated herein by reference. A solution polymerization method employing lithium metal or organo metallic compounds along with post-treatment to incorporate terminal carboxyl, terminal isocyanato, or terminal amido groups is disclosed in U.S. Pat. No. 3,135,716 incorporated herein by reference. One skilled in the art of anionic polymerization would arrive at a suitable composition by incorporation of the suggested monomers, types of chain length regulators and functional chain terminating compounds described in this specification along with the methods suggested in U.S. Pat. Nos. 3,135,716 and 4,056,559. Details of these methods are beyond the scope of this disclosure.

The preferred dispersants are relatively low molecular weight polyacrylate or polymethacrylate polymers prepared by free radical polymerization. Preferred embodiments contain one or more terminal functional groups for example, terminal groups containing ethylenic, mercapto, carboxyl, hydroxyl, anhydro, oxirane, amino, amido or isocyanato groups or mixtures. Incorporation of a terminal functional group can be achieved by employing a polymerization initiator containing one of the desired functional groups. Alternatively, a terminal group containing one or more desired functional groups can be incorporated at the chain terminating end of the polymer by employing a chain transfer agent or short-stopping agent containing the desired functional group(s). Preferredly both a functional group containing initiator and a functional group containing chain transfer agent are employed in the preparation of the preferred secondary dispersants used in the present invention. Where both ends of the dispersant polymer contain a functional group, these may be independently selected from the aforesaid groups.

In yet another embodiment, there can be incorporated on a terminal unit, a multi-functional group, incorporated for example by post reaction of a terminal functional polyacrylate with a co-reactive compound containing a plurality of functional groups for example trimethylolpropane tri-thioglycolate, 3-mercapto succinic acid and thiolactic acid.

A method of incorporating terminal carboxyl functionality by way of free radical polymerization is disclosed in U.S. Pat. No. 3,285,949 incorporated herein by reference. Terminal ethylenic unsaturation can be incorporated on to a terminal carboxyl polymer by reaction with an ethylenic unsaturated oxirane containing compound such as glycidyl acrylate. A method of incorporating mercaptan terminal functionality on a low molecular weight polyacrylate is described in U.S. Pat. No. 3,711,451 incorporated herein by reference. A method of incorporating amine terminal functionality is disclosed in U.S. Pat. No. 3,306,809 incorporated herein by reference.

A detailed description of the preparation of relatively low molecular weight terminal carboxyl group containing polyacrylates by solvent based free radical polymerization methods is given in U.S. Pat. No. 4,863,990 incorporated herein by reference. Following these methods, a suitable oil soluble free radical polymerization initiator is used. Examples are selected from among known conventional free radical initiators such as organic peroxides, percarbonates, and azo compounds. Selection of the amount and type of initiator will depend generally upon the desired molecular weight and temperature range of polymerization, the monomeric materials being copolymerized, and other considerations known by one of ordinary skill in the art. In the preparation of example embodiments, a polymerization initiator optionally and preferredly containing at least one said functional group is combined with solvent medium and monomer(s) in a vessel having agitation and condensing means. Suitable specific polymerization initiators include benzoyl peroxide, acetyl benzoyl peroxide, diacetyl peroxide, peroxydicarbonates, diacyl peroxides and 4,4'-azobis(4-cyanovaleric acid) (ACVA). ACVA is a preferred initiator containing a carboxyl group. The amount of initiator used is generally in the range of about 0.1 to about 10 parts by weight per 100 parts by weight of total monomer(s) (phm). It is preferred to employ an amount of initiator in the range of about 1.0 phm by weight to about 10 phm. The reaction is carried out in any medium, preferably in an organic solvent medium. For preparing poly acrylates, organic solvents may be selected from alkyl ethers or ketones, for example THF or methyl ethyl ketone. The reaction temperature and pressure are controlled to enable the desired initiation and rate of polymerization appropriate for the selected initiator and solvent medium. Generally under free radical addition polymerization, control of molecular weight is brought about by a variety of ways such as by the use of a high proportion of initiator, high temperature, chain transfer agent (CTA) or a combination of these methods. One preferred method of controlling the molecular weight of a dispersant prepared by the free radical method is by incorporation of a chain transfer agent preferredly a functional group containg chain transfer agent. The preferred chain transfer agents are those which contain carboxyl, anhydro hydroxyl, isocyanato, amido, amine or mercaptan groups and most preferredly are those which contain one or a few carboxyl groups. An example of a preferred carboxyl group containing chain terminating agent is thioglycolic acid. Specific examples of other preferred chain transfer agents include thio-$\beta$-naphthol, thiophenol, thioglycerine ethylthioglycolate, alkyl amines, n-butyl thioglycolate, isooctyl thioglycolate, mercaptoethanol, thioglycolic acid (TGA), mercapto succinic acid, n-butyl-3-mercaptopropionate, glycol dimercaptoacetate, trimethylolpropane trithioglycolate, 3-mercapto propionic acid and thiolactic acid. As a result of the use of sufficient amount of CTA, the polymerization product used as the dispersant of this invention will have an average molecular weight generally from about 500 to about 50,000, preferably 500 to 20,000 and more preferredly from about 1500 to about 6000.

A detailed description of the various methods of preparation of the secondary dispersants employed in the process of this invention is beyond the scope of the present invention and will not be dealt with herein greater detail. Sufficient detail of various embodiments disclosed herein as well as the methods in the incorporated references listed herein will enable a skilled practitioner to reduce the embodiments to practice with a reasonable effort.

The amount of polymer dispersant used in polymerization processes of this invention shall be any effective amount for providing dispersant action enabling the achievement of the desired improvements in the resin properties listed herein. Generally, an amount of dispersant employed on the basis of weight parts per hundred weight parts of vinyl monomer (phm) ranges from about 0.005 phm to about 5.0 phm and preferredly from about 0.02 phm to about 0.2 phm.

The particulate polymer resins prepared by this invention are useful for the ease of processing and reproducibility when processed into articles by melt processing methods. The resins prepared by this invention can be processed into a fused state on a wide variety of equipment including but not limited to: injection molding machines, extruders, thermoforming equipment, calenders, etc.

The molded articles derived therefrom can be used in a wide variety of applications including but not limited to: oil resistant adhesives, footwear, automotive components, gaskets, tools, hoses, packaging articles, film barriers, sheets, floor mats, pond liners, wire and cable jacketing, roofing membranes, etc.

EXAMPLES

The following polyacrylate dispersants employed in the examples below were prepared by free radical polymerization using ACVA initiator and TGA chain transfer agent. In some examples this polymer was subsequently reacted with a carboxyl reactive ethylenic unsaturated compound containing a functional group incorporated thereon which is listed in the following examples:

| Dispersant | MW[1] | Termination |
|---|---|---|
| A | 1900 | Allyl |
| B | 3100 | Allyl |
| C | 5700 | Allyl |
| D | 1700 | Carboxyl |
| E | 3100 | Carboxyl |
| F | 5500 | Carboxyl |
| G | 3700 | None |
| H | 5900 | None |
| I | 2000 | Methacrylate |
| J | 3400 | Hydroxyl |

[1]determined by gel permeation chromatography

PVC suspension polymerizations were carried out at different polymerization temperatures using the following general recipe, and typical reactor charging procedure:

| Material | Recipe PHM Parts |
|---|---|
| Vinyl Chloride Monomer (VCM) | 100.0 |
| Demineralized Water | 140.0 |
| Polyvinyl Aocohol 1 72.5% hydrolysis | 0.05 |
| Polyvinyl Alcohol 2 88% hydrolysis | 0.016 |
| HPMC | 0.007 |
| Secondary Dispersant* | Variable |
| Initiator[1] | 0.045 |
| Phenolic Short-stop | 0.02 |

*The control prior art secondary dispersant is PVA - low hydrolysis
[1]Ethylhexyl peroxydicarbonate (EHP)

TYPICAL REACTOR CHARGING PROCEDURE 100 phm of VCM, 140 phm of deionized (D.I.) water, .007 phm of hydroxypropyl methylcellulose, 0.05 phm of PVA1 and PVA2, secondary dispersant and polymerization initiator were introduced into a 55 L capacity reactor equipped with an agitator. The polymerization was conducted at a temperature of 53° or 70° C. under agitation at 500 rpm. The polymerization was stopped in each example after a pressure drop of 20 psi using a phenolic short-stop. The resins were then stripped of unreacted monomer, dewatered, and dried. Particle characterization included: average particle size (APS), % particle fines (PAN) and DOP (di-2-ethylhexyl phthalate) absorption porosity (POR). Average particle size was determined by standard screen analysis using an ATM Sonic Sifter Model No. 63-P and employing screens with 40, 60, 80, 100, 140 and 200 mesh sizes. The percent particle fines (PAN) were those passing through the 200 mesh screen into the pan below. DOP porosity was measured by adding DOP to a known weight of dry resin, allowing sufficient time for absorption and filtering excess DOP. Porosity is expressed in terms of volume of plasticizer absorbed per weight of dry resin used (cc/g).

Plasticizer powder mix time (PMT) was determined according to ASTM D-2396. A visual inspection of poly build-up was quantified using a rating scale to compare the extent of reactor cleanliness after polymerization. Lower numerical scores denote a cleaner reactor vessel relative to the control which is rated at 1.0.

TABLE I

| Example | Secondary Dispersant | Phm | APS (μ) | PAN % | POR cc/g | PMT Sec. | Poly Build-up |
|---|---|---|---|---|---|---|---|
| 1 | None | — | 141 | 0 | 0.288 | 369 | 1.0 |
| 2 | PVA-LH | 0.04 | 90 | 13.1 | 0.345 | 300 | 1.0 |
| 3 | A | 0.04 | 113 | 1.0 | 0.342 | 297 | 0.8 |
| 4 | B | 0.04 | 108 | 3.9 | 0.338 | 306 | 0.25 |

In Table I, polymerization runs using no secondary dispersant (Ex. 1), prior art (Ex. 2) and Examples 3 and 4 are compared. Control Example 2 illustrates an expected improvement in porosity and a corresponding reduction in plasticizer powder mix time compared with Control Example 1 which did not employ a secondary dispersant. It is also noted that Control Example 2 resulted in increased incidences of particle fines at 13.1% PAN and an undesirable reduction in average particle size. The poly build-up results were identical and given an arbitrary standard value of 1.0 with which to compare the experimental examples. Examples 3 and 4 employ allyl terminated polyacrylates having 1900 and 3100 molecular weight averages respectively. Resins produced from these showed higher APS, reduced % PAN, comparable porosity and PMT while poly build-up was reduced. Control Example 2 exhibited undesirable foaming during stripping. Examples 3 and 4 exhibited significant reduction in foaming during monomer stripping. These results were unexpected and represent significant improvements in overcoming the undesirable effects of using prior art secondary dispersants.

TABLE II

| Example | Secondary Dispersant | Phm | APS (μ) | PAN % | POR cc/g | PMT Sec. | Poly Build-up |
|---|---|---|---|---|---|---|---|
| 5 | PVA-LH | 0.1 | 81 | 23 | 0.437 | 288 | 1.8 |
| 6 | A | 0.1 | 107 | 5.1 | 0.362 | 285 | 1.0 |

Table II illustrates the increased advantageous departure from the results achieved using low hydrolysis PVA versus the (meth)acrylate secondary disperant when used at a higher amount of 0.1 phm. As expected, Example 5 at the higher PVA-LH level increased the porosity as compared to Examples 1 or 2 with the lesser PVA level. It was also evident that the APS was further depressed (81μ vs. 141 and 90, respectively) and the % PAN was significantly increased. Example 6 using dispersant A at 0.1 phm exhibited increased POR compared with the corresponding example 3 and PMT dropped accordingly. It was unexpected that APS and % PAN would be controlled to this extent. APS was not depressed to a significant degree (107 vs 113) and % PAN was increased to 5.1% vs 1.0%. This was surprising in view of the expectation that the resin properties would worsen using higher levels of secondary dispersant. Moreover reactor fouling increased in both Examples 5 and 6 when higher levels of secondary dispersant, but less severely with Example 6 versus Example 5.

TABLE III

| Example | Secondary Dispersant | Phm | APS (μ) | PAN % | POR cc/g | PMT Sec. | Poly Build-up |
|---|---|---|---|---|---|---|---|
| 7 | C | 0.04 | 112 | 1.0 | 0.327 | 345 | 0.2 |
| 8 | D | " | 171 | 0.0 | 0.345 | 303 | 1.3 |
| 9 | E | " | 163 | 0.0 | 0.342 | 268 | 1.3 |
| 10 | F | " | 120 | 1.0 | 0.290 | 360 | 0.2 |

TABLE III-continued

| Example | Secondary Dispersant | Phm | APS (μ) | PAN % | POR cc/g | PMT Sec. | Poly Build-up |
|---|---|---|---|---|---|---|---|
| 11 | G | " | 148 | 0.0 | 0.308 | 343 | 1.4 |
| 12 | H | " | 143 | 0.0 | 0.269 | 398 | 0.5 |
| 13 | I | " | 112 | 2.0 | 0.318 | 330 | 1.2 |
| 14 | J | " | 129 | 0.5 | 0.287 | 350 | 0.75 |

From inspection of Table III it is shown that all of the embodiments of the secondary dispersants employed in preparing the resins of Examples 7-14 generally exhibit improvements in maintaining larger average particle size and reduced particle fines. Improved porosity is seen in comparisons within the series of allyl terminated acrylates of Examples 3, 4 and 7 wherein porosity improves when lower molecular weight acrylate dispersants are employed. The same trend appears relative to the carboxyl terminal acrylates used in Examples 8, 9, and 10. Also noted were substantial improvements in reduced foaming tendencies when stripping the wet resins of the above Examples 7-14.

Examples 11 and 12 were prepared using secondary dispersants G and H which had no terminal functional group thereon. Thus, Examples 11 and 12 do not contain a functional terminal group other than a group contributed by the initiator fragment. The results compare less favorably generally with the other examples in Table III in terms of lower porosity, higher plasticizer mix time or higher poly build-up.

Example 13 employed dispersant I which is a methacrylate terminal functional polyacrylate having 2000 average molecular weight. The closest comparison can be made to Example 3 having allyl functionality and similar molecular weight. Allyl functionality yielded generally better results and is preferred over embodiments such as Example 13.

Example 14 having a secondary dispersant J with terminal hydroxyl functionality and average molecular weight of 3400 can be compared with Example 4 using dispersant B with average MW of 3100 and allyl functionality and Example 9 using dispersant E average MW of 3100 and carboxyl functionality. The balance of properties suggests somewhat less porosity but intermediate improvements in PAN, APS and improved poly buildup over prior art versions.

Referring to Table IV, Examples 15-18 illustrate the results of an investigation of the effects of higher polymerization temperature on the resin properties measured. The examples of Table IV were polymerized at 70° C. versus all others which were polymerized at 53° C.

TABLE IV

| Example | Secondary Dispersant | Phm | APS (μ) | PAN % | POR cc/g | PMT Sec. | Poly Build-up |
|---|---|---|---|---|---|---|---|
| 15 | — | — | 125 | 1.5 | 0.131 | 570 | 1.5 |
| 16 | PVA-LH | 0.04 | 76 | 34.0 | 0.202 | 375 | 1.5 |
| 17 | A | 0.04 | 138 | 1.5 | 0.189 | 400 | 0.5 |
| 18 | B | 0.04 | 105 | 6.0 | 0.183 | 396 | 1.4 |

From the table it is observed that Example 16 employing the PVA secondary dispersant at a higher polymerization temperature resulted in a drastic particle size reduction and increased fine particulates. Porosity is improved versus Example 15 with no secondary dispersant (0.202 vs. 0.131) and plasticizer powder mix time is improved. Examples 17 and 18 show a better balance of particle size retention, fines levels, porosity and reactor build-up. Thus, the use of the novel secondary dispersants allows one to obtained the improved balance of properties at higher polymerization temperatures.

Several example resins employing the process of this invention were evaluated for incidence of fisheyes and compared to Control Examples 1 and 2 made with no secondary dispersant and with PVA-low hydrolysis respectively. Films were milled on a two-roll mill. Fisheyes were counted and expressed as a number observed per standard unit area.

TABLE V

| Example | Secondary Dispersant | Phm Level | Fisheye #/Area |
|---|---|---|---|
| 1 | — | — | 7 |
| 2 | PVA-LH | 0.04 | 10 |
| 5 | A | 0.04 | 1 |
| 7 | C | 0.04 | 4 |
| 6 | A | 0.1 | 19 |

Example 6 of Table V illustrates there was an undesirable increase in the level of fisheyes at the 0.1 phm usage level. Table V also illustrates a low incidence of fisheyes in Examples 5 and 7 compared to Control Examples 1 and 2 at the desired 0.04 phm level. This feature combined with the previous demonstrated improvements illustrates a significant simultaneous improvement in resin qualities by the practice of this invention.

Various changes and modifications may be made in carrying out the present invention without departing from the spirit and scope thereof. Insofar as these changes are within the purview of the appended claims, they are to be considered as part of the invention.

What is claimed is:

1. A particulate suspension vinyl polymer resin produced by polymerizing at least one vinyl monomer in the presence of from about 0.02 to about 0.1 parts by weight per 100 weight parts of monomer of at least one dispersant wherein said dispersant comprises principally:

repeating units from α,β-unsaturated ester(s) of acrylic and/or methacrylic acid; and wherein said dispersant contains at least one terminal functional group selected from the group consisting of carboxyl, ethylenic, hydroxyl, anhydro, oxirane, amido, amino and isocyanato groups and said resin contains the residue of said dispersant.

2. The particulate vinyl polymer resin of claim 1 polymerized in the presence of said dispersant; said resin is selected from the group consisting of polystyrene, polystyrene-co-butadiene, polystyrene-co-acrylonitrile, polyacrylonitrile-butadiene-styrene, polyvinyl chloride homopolymers, polyvinyl halide copolymers.

3. The particulate vinyl polymer resin of claim 1 polymerized in the presence of said dispersant which is derived from one or more $C_4$–$C_{10}$ alkyl esters of acrylic and/or methacrylic acid.

4. The particulate vinyl polymer of claim 1 wherein said dispersant contains two terminal units, one at each end, wherein at least one terminal unit is derived from a functional group containing initiator.

5. The particulate vinyl polymer of claim 4 wherein said initiator contains a functional group selected from the group consisting of carboxyl, ethylenic, hydroxyl, anhydro, oxirane, amido, amino and isocyanato groups.

6. The particulate vinyl polymer of claim 5 wherein both said terminal units on said dispersant contain functional groups independently selected from the group consisting of: carboxyl, ethylenic, mercapto, hydroxyl, anhydro, oxirane, amido, amino and isocyanato groups.

7. The particulate vinyl polymer of claim 1 wherein said dispersant contains a terminal unit derived from a functional group containing chain transfer agent.

8. The particulate vinyl polymer of claim 7 wherein said chain transfer agent contains a functional group selected from the group consisting of: carboxyl, ethylenic, mercapto, hydroxyl, anhydro, oxirane, amido, amino and isocyanato groups.

9. The particulate vinyl polymer of claim 1 wherein said dispersant contains terminal units derived from a functional group containing initiator and a functional group containing chain transfer agent.

10. The particulate vinyl polymer of claim 1 polymerized in the presence of a dispersant, said dispersant is a graft reaction product of a terminal ethylenic unsaturated (meth)acrylate polymer and a vinyl polymer or a polymerizing vinyl polymer.

11. The particulate vinyl polymer resin of claim 1 in a fused state.

12. The particulate vinyl polymer resin of claim 1 in the form of a molded article.

* * * * *